Patented July 27, 1948

2,445,901

UNITED STATES PATENT OFFICE 2,445,901

METHOD OF SEATING PISTON RINGS IN INTERNAL-COMBUSTION ENGINES

Henry A. Ambrose, Penn Township, Allegheny County, Pa., assignor to Gulf Research & Development Company, Pittsburgh, Pa., a corporation of Delaware No Drawing. Application June 19, 1945, Serial No. 600,408

7 Claims. (Cl. 252—25)

This invention relates to improved procedure for seating piston rings in an internal combustion engine.

In the manufacture of internal combustion engines, including spark ignition engines such as are used in passenger cars, trucks and buses; aircraft engines; and Diesel engines, it has been the practice to subject the assembled engine to a "running-in" or "breaking-in" period during which the engine is operated at light or moderate load and moderate speed to mate the metal surfaces to each other. This operation is of special importance for proper seating of piston rings against the inside walls of the cylinder barrel or bore. Proper seating of the piston rings provides low frictional resistance between ring faces and cylinder walls, reduces wear, minimizes passage of combustion products from the combustion chamber to the crankcase, thus minimizing loss of power and reduces consumption of lubricating oil.

In the manufacture of some engines, as for example certain aircraft engines, a more rapid seating of the piston rings is obtained by the use of tapered rings. The ring face is not parallel to the cylinder wall but may be at an angle of from about ½° to 2° from a line parallel to the vertical axis of the cylinder wall. When the engine is first started there is practically line contact between the ring face and the cylinder wall. The area of contact is increased at a relatively rapid rate thereby giving apparently rapid seating of the ring. It is desirable to decrease the time necessary to seat piston rings, including the above-mentioned tapered rings, in order to reduce the power expended as well as manpower and overhead cost.

It is therefore the primary object of this invention to provide an improved method of seating piston rings in an internal combustion engine.

It is a further object of this invention to provide a process for quick seating of piston rings.

These and other objects are attained by this invention in which the breaking-in and seating of piston rings is accelerated by operating the engine with a lubricating oil containing a polishing compound such as finely divided silica in an amount not in excess of 1 per cent of the oil and preferably about 0.5 per cent by weight of the lubricating oil.

Ordinarily it is considered undesirable to operate internal combustion engines with oil containing hard solids in suspension in the oil because of rapid wear of the engine parts and possibly scoring of such parts. It would be expected that objectionable wear would be obtained in breaking-in an engine with oil containing a polishing agent and that scoring of the engine parts and "feathering" of the edges of the rings might occur. It has been found, however, according to the present invention, that oil containing suspended polishing agents of small particle size and in amounts not in excess of 1 per cent of the lubricating oil accelerate the wearing-in of rings and the cylinder barrel, and that no objectionable scoring or "feathering" occurs. Polishing agents of the size and quantity herein specified cause a high polish.

Polishing agents falling within the scope of the present invention include finely divided materials such as silica, aluminum oxide, rouge, magnesia and fuller's earth. Finely powdered polishing materials of this type can be suspended in oil for reasonable periods of time and do not settle out of the oil to any appreciable extent during the operation of an engine. However, their dispersion in oil may be improved by using any suitable dispersing agent compatible with oil such as polar compounds (oleic acids and the like) or detergent-dispersers of the type commonly used in heavy duty Diesel engine lubricating oils.

A compound that has been found to be particularly desirable for use in the present invention is a commercial finely divided silica gel from which the water has been removed. The following is a typical analysis:

| | Per cent |
|---|---|
| $SiO_2$ | 90 |
| Volatile | 5.5 |
| Sodium sulfate | 3.5 |
| Iron and aluminum oxide | 1 |

The amount of polishing agent which may be used varies between 0.1 per cent and 1.0 per cent based upon the lubricating oil and 0.5 per cent has been found to be preferable.

The polishing agent used should have a small particle size but not substantially exceeding 0.1 mm. and preferably having a particle size of about 0.001 mm. The particle size herein indicated is meant the particle size before use since it will be understood that during operation of the engine the particles will be sheared into smaller sizes.

The polishing agent used should also be relatively hard and should preferably have a hardness exceeding 4 on the Moh scale as well as a small particle size. This includes the materials already mentioned as well as asbestos, feldspar, agate, steel, etc.

In accordance with the present invention an engine may either be operated by its regular fuel, that is gasoline or fuel oil, or it may be caused to operate by an external power source such as an electric motor.

The lubricating oil may be any type of lubricating oil ordinarily used in the engine being treated, for example a Pennsylvania motor lubricating oil of a viscosity of SAE 30. Preferable embodiments of the present invention are illustrated by the following example.

Example

A Lauson single cylinder gasoline engine was rotated at an R. P. M. of approximately 1800 by the use of an electric motor. The engine was equipped with Ford piston rings having a taper of approximately 20 minutes. The crankcase was charged with a Pennsylvania motor oil of a viscosity of SAE 30 and a commercial finely divided silica gel such as previously described. The engine was run for 6 hours and the rings weighed and examined at the end of each 2-hour period. The following table indicates the ring wear:

| Addition to Oil | Ring | Ring Weight Loss, Mg. | | | Approx. Per Cent of Ring Face Polished at 6 Hrs. |
|---|---|---|---|---|---|
| | | 2 Hrs. | 4 Hrs. | 6 Hrs. | |
| None | Top | 1.2 | 2.8 | 3.7 | 35 |
| Do | 2d | 1.1 | 1.2 | 1.5 | |
| 0.2% Silica gel | Top | 2.7 | 4.3 | 5.5 | 50 |
| Do | 2d | 2.1 | 3.6 | 4.4 | |
| 0.5% Silica gel | Top | 5.5 | 9.9 | 13.3 | 85 |
| Do | 2d | 4.2 | 8.7 | 10.8 | |

Examination of the ring face and cylinder wall at the end of 6 hours showed that they were polished and free of any scoring or "feathering." It will be seen that the addition of 0.2 per cent of the polishing agent to the oil accelerated the breaking-in by approximately 50 per cent while the addition of 0.5 per cent of the polishing agent accelerated the breaking-in by approximately 140 per cent.

Thus the present invention provides a process of breaking-in an engine by the use of said composition whereby the seating of piston rings is greatly accelerated.

What I claim is:

1. A method of seating piston rings in an internal combustion engine comprising operating the engine while the crankcase thereof contains a lubricating oil in which is dispersed from 0.1 to 1.0 per cent by weight (based on the lubricating oil) of a finely divided solid inorganic material having abrasive qualities and a particle size not greater than 0.1 mm.

2. A method of seating piston rings in an internal combustion engine comprising operating the engine while the crankcase thereof contains a lubricating oil in which is dispersed from 0.1 to 1.0 per cent by weight (based on the lubricating oil) of a finely divided solid inorganic material having abrasive qualities and having a particle size of about 0.001 mm.

3. A method of seating piston rings in an internal combustion engine comprising operating the engine while the crankcase thereof contains a lubricating oil in which is dispersed from 0.1 to 1.0 per cent by weight (based on the lubricating oil) of a finely divided solid inorganic material having abrasive qualities, having a particle size not greater than 0.1 mm. and a hardness in excess of 4 on the Moh scale.

4. A method of seating piston rings in an internal combustion engine comprising operating the engine by the use of an external power source while the crankcase thereof contains a lubricating oil in which is dispersed from 0.1 to 1.0% by weight (based on the lubricating oil) of a finely divided solid inorganic material having abrasive qualities and having a particle size not greater than 0.1 mm.

5. A method of seating piston rings in an internal combustion engine comprising operating the engine while the crankcase thereof contains a lubricating oil in which is dispersed from 0.1 to 1.0 per cent by weight (based on the lubricating oil) of finely divided silica having a particle size not greater than 0.1 mm.

6. A method of seating piston rings in an internal combustion engine comprising operating the engine while the crankcase thereof contains a lubricating oil in which is dispersed from 0.1 to 1.0 per cent by weight (based on the lubricating oil) of finely divided rouge having a particle size not greater than 0.1 mm.

7. A method of seating piston rings in an internal combustion engine comprising operating the engine while the crankcase thereof contains a lubricating oil in which is dispersed from 0.1 to 1.0 per cent by weight (based on the lubricating oil) of finely divided aluminum oxide having a particle size not greater than 0.1 mm.

HENRY A. AMBROSE.

REFERENCES CITED

The following references are of record in the file of this patent:

UNITED STATES PATENTS

| Number | Name | Date |
|---|---|---|
| 482,249 | Harmon | Sept. 6, 1892 |
| 830,739 | Potter | Sept. 11, 1906 |
| 1,463,502 | Buttenfield | July 31, 1923 |
| 1,588,290 | Alpers | June 8, 1926 |
| 1,879,874 | Kidder | Sept. 27, 1932 |
| 2,050,139 | Wanamaker | Aug. 4, 1936 |
| 2,278,851 | Hillman | Apr. 7, 1942 |

OTHER REFERENCES

Bennett-Chemical Formulary, vol. III, page 284.
Klemgard, Lubricating Greases, pages 688, 714, 720–1.